United States Patent
Wuthishuwong et al.

(10) Patent No.: US 12,001,214 B2
(45) Date of Patent: *Jun. 4, 2024

(54) SYSTEM AND METHOD FOR TRAJECTORY ESTIMATION

(71) Applicant: Aptiv Technologies AG, Schaffhausen (CH)

(72) Inventors: Chairit Wuthishuwong, Wuppertal (DE); Markus Pär Oscar Carlander, Hisnings Kärra (SE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,073

(22) Filed: Jan. 30, 2023

(65) Prior Publication Data

US 2023/0185304 A1    Jun. 15, 2023

Related U.S. Application Data

(63) Continuation of application No. 16/849,327, filed on Apr. 15, 2020, now Pat. No. 11,567,500.

(30) Foreign Application Priority Data

Apr. 24, 2019 (EP) .................................... 19170945

(51) Int. Cl.
*B60W 10/20* (2006.01)
*B60W 30/09* (2012.01)
(Continued)

(52) U.S. Cl.
CPC ........... *G05D 1/0214* (2013.01); *B60W 10/20* (2013.01); *B60W 30/09* (2013.01);
(Continued)

(58) Field of Classification Search
None
See application file for complete search history.

(56) References Cited

U.S. PATENT DOCUMENTS 8,170,739 B2    5/2012  Lee
9,457,807 B2   10/2016  Lee et al.
(Continued)

FOREIGN PATENT DOCUMENTS

DE     102019110759 A1 * 11/2019 ............ B60W 30/09
WO     2006/122867 A1    11/2006

OTHER PUBLICATIONS

Extended European Search Report for EP Application 19 17 0945, dated Oct. 25, 2019.
(Continued)

*Primary Examiner* — Peter D Nolan
*Assistant Examiner* — Demetra R Smith-Stewart
(74) *Attorney, Agent, or Firm* — Harness, Dickey & Pierce, P.L.C.

(57) ABSTRACT

A system for estimating a trajectory of a vehicle includes vehicle state sensors detecting a state of movement of the vehicle and environment sensors monitoring an environment of the vehicle. A free space module determines a free space corridor based on the detected state of movement of the vehicle and the monitored environment of the vehicle. A goal point determination module determines at least one goal point for the trajectory to be estimated based on the free space corridor. A trajectory planning module estimates a reference trajectory based on the at least one goal point and calculates a deviation between an actual trajectory and the reference trajectory of the vehicle. A trajectory control module minimizes the deviation between the actual trajectory and the reference trajectory of the vehicle and outputs (Continued)

Figure 2:
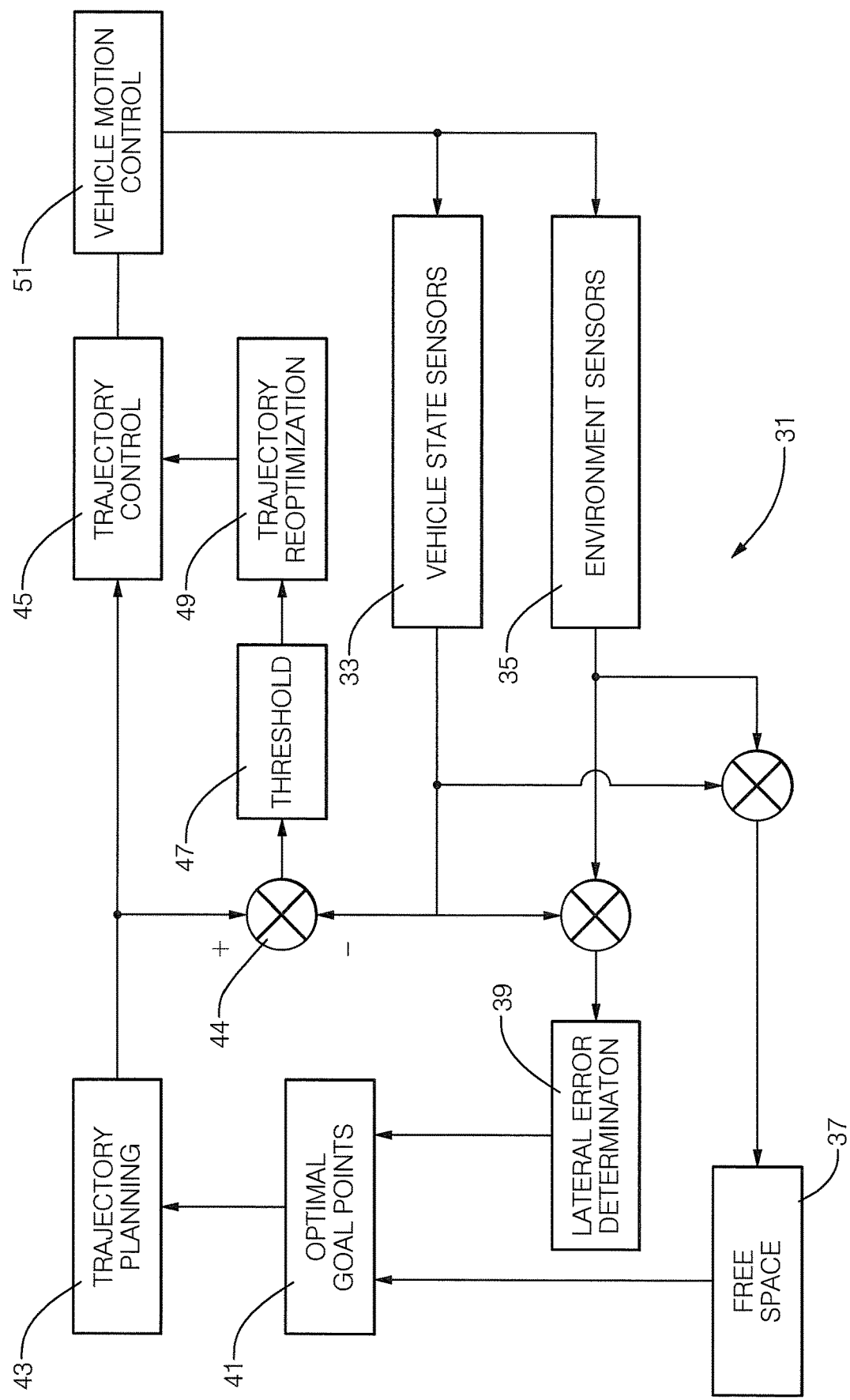

optimal control parameters for the movement of the vehicle based on the minimized deviation.

15 Claims, 10 Drawing Sheets

(51) Int. Cl.
*B60W 30/095* (2012.01)
*B60W 30/12* (2020.01)
*G01S 13/931* (2020.01)
*G01S 17/89* (2020.01)
*G05D 1/00* (2006.01)
*G08G 1/16* (2006.01)

(52) U.S. Cl.
CPC .... *B60W 30/0953* (2013.01); *B60W 30/0956* (2013.01); *B60W 30/12* (2013.01); *G01S 13/931* (2013.01); *G01S 17/89* (2013.01); *G08G 1/167* (2013.01); *B60W 2420/408* (2024.01); *G01S 2013/9318* (2020.01)

(56) References Cited

U.S. PATENT DOCUMENTS

| | | | |
|---|---|---|---|
| 9,669,828 B2* | 6/2017 | Caveney | G08G 1/161 |
| 9,718,466 B2 | 8/2017 | Kim et al. | |
| 2002/0169531 A1 | 11/2002 | Kawazoe et al. | |
| 2008/0125939 A1 | 5/2008 | Luke | |
| 2010/0228420 A1 | 9/2010 | Lee | |
| 2013/0317698 A1 | 11/2013 | Yoon et al. | |
| 2014/0207325 A1 | 7/2014 | Mudalige et al. | |
| 2015/0346723 A1 | 12/2015 | Pedersen | |
| 2016/0304120 A1 | 10/2016 | Okada et al. | |
| 2017/0168485 A1 | 6/2017 | Berntorp et al. | |
| 2018/0348786 A1 | 12/2018 | Yasui et al. | |
| 2018/0356819 A1 | 12/2018 | Mahabadi et al. | |
| 2019/0377354 A1* | 12/2019 | Shalev-Shwartz | B60W 30/0956 |
| 2019/0391580 A1 | 12/2019 | Di Cairano et al. | |
| 2020/0278686 A1 | 9/2020 | Liu et al. | |
| 2020/0409378 A1* | 12/2020 | Benisch | G05D 1/0088 |

OTHER PUBLICATIONS

Mouhagir, et al., Using Evidential Occupancy Grid for Vehicle Trajectory Planning Under Uncertainty with Tentacles, 20th IEEE International Conference on Intelligent Transportation (ITSC 2017), Oct. 2017, Yokohama, Japan. pp. 1-7.

Werling, et al., Optimal trajectories for time-critical street scenarios using discretized terminal manifolds, The International Journal of Robotics Research, 31(3) 346-359.

Werling, et al., Optimal Trajectory Generation for Dynamic Street Scenarios in a Frenet Frame, 2010 IEEE International Conference on Robotics and Automation, Anchorage Convention District, May 3-8, 2010, Anchorage, Alaska, USA, pp. 987-993.

* cited by examiner

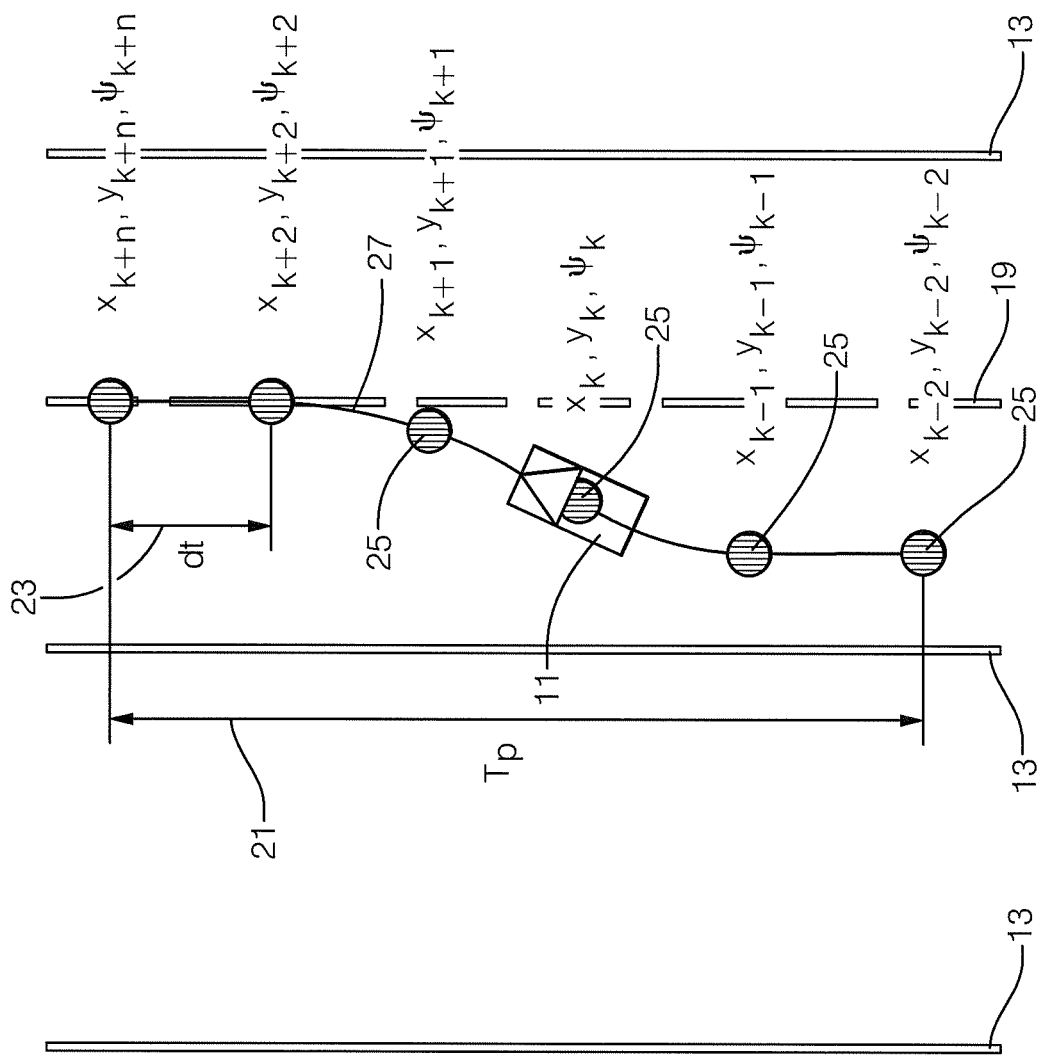
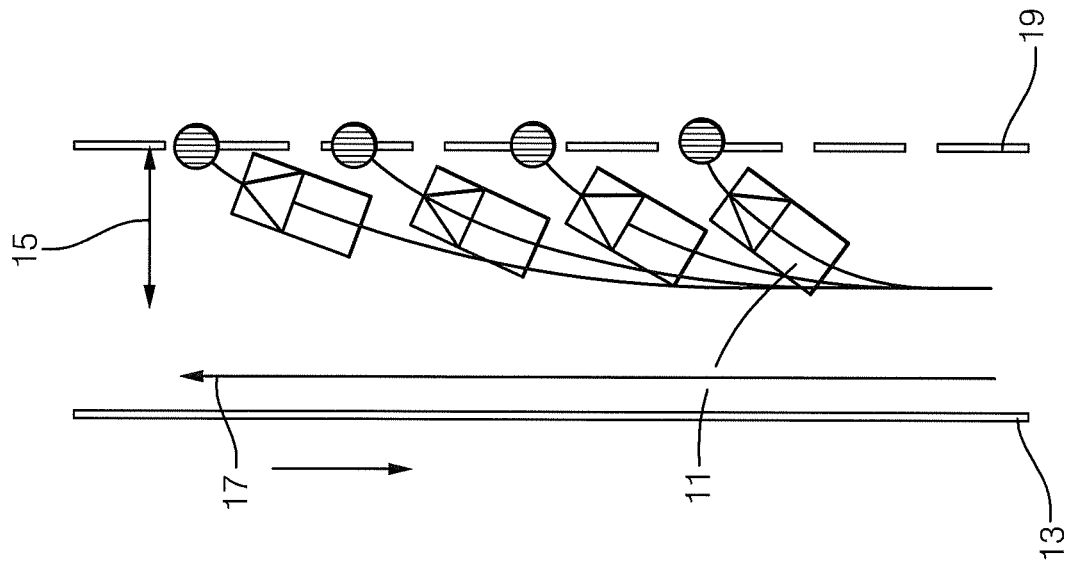
FIG. 1(a)
FIG. 1(b)

SYSTEM AND METHOD FOR TRAJECTORY ESTIMATION

CROSS REFERENCE TO RELATED APPLICATION

This application is a continuation of U.S. patent application Ser. No. 16/849,327, filed on Apr. 15, 2020, which claims priority to European Patent Application No. 19170945.0, filed on Apr. 24, 2019.

FIELD

The present disclosure relates to a system and a method for estimating a trajectory of a vehicle.

BACKGROUND

Advanced driver assistance systems (ADAS) have been developed to support drivers in order to drive a vehicle more safely and comfortably. These systems comprise, for example, adaptive cruise control (ACC) and lane keeping assistance (LKA).

An adaptive cruise control attempts to maintain a speed set by a driver of the vehicle or to keep a certain distance to a target vehicle in front of the vehicle comprising the adaptive cruise control. Therefore, the adaptive cruise control is effective only to control the speed of the vehicle in a longitudinal direction, and the driver has to control a steering wheel of the vehicle, i.e. any lateral movement.

On the other hand, lane keeping assistance is provided for lateral control and keeps a vehicle in a lane by steering the wheels in order to compensate for any undesired lateral deviations with respect to a distance from lane markers, for example. However, if lane keeping assistance is activated, there is no speed control for the vehicle. Although the steering is controlled by the lane keeping assistance, a driver still has to control a steering wheel and to take over control if necessary.

Furthermore, if an adaptive cruise control and a lane keeping assistance were activated at the same time, the vehicle might be understeered in a longitudinal and lateral direction since these systems are usually not coupled and their control signals are treated separately.

In order to improve the capability of vehicles regarding autonomous driving, trajectory planning has been developed to allow a synchronous control of a vehicle in both longitudinal and lateral direction. In addition, a planned trajectory is usually updated if the driving situation changes. However, collision avoidance has not been considered a priori in many of the proposed trajectory planning systems.

In order to determine a collision free space in front of a vehicle, a so-called occupancy grid technique has been proposed which analyzes the state of cells defined by a grid in front of the vehicle. For each cell it is checked if it is occupied, partly occupied, occluded or free by using sophisticated mathematical methods. In order to guarantee a collision-free space in front of a vehicle, the size of the grid, i.e. the number of its cells, is getting large if the curvature of the road increases. Furthermore, the occupancy grid is usually designed on the basis of a world coordinated system. That is, the occupancy grid technique requires multiple transformation steps since trajectory planning is usually performed in a vehicle coordinate system. Thus, using the occupancy grid technique in addition to trajectory planning is accompanied by a high computational effort.

Accordingly there is a need to provide a system and a method which are able to identify a collision free and optimal lane keeping trajectory for a vehicle.

SUMMARY

In one aspect, the present disclosure is directed at a system for estimating a trajectory of a vehicle including vehicle state sensors detecting a state of movement of the vehicle and environment sensors monitoring an environment of the vehicle. The system includes a free space module which determines a free space corridor based on the detected state of movement of the vehicle and based on the monitored environment of the vehicle, and a goal point determination module which determines at least one goal point for the trajectory to be estimated based on the free space corridor. A trajectory planning module estimates a reference trajectory based on the at least one goal point and calculates a deviation between an actual trajectory and the reference trajectory of the vehicle. A trajectory control module minimizes the deviation between the actual trajectory and the reference trajectory of the vehicle and outputs optimal control parameters for the movement of the vehicle based on the minimized deviation.

The state of movement of the vehicle may comprise its current position, velocity, acceleration and yaw rate. Information regarding the monitored environment of the vehicle may include, for example, an existence of and/or a distance to lane markers, other vehicles or objects. Furthermore, the free space corridor may comprise a part of the space within the field of vision of the environment sensors and/or a driver of the vehicle being free of obstacles for the intended driving direction of the vehicle.

Since the free space corridor is considered when the at least one goal point is determined and therefore when the reference trajectory is estimated based on the at least one goal point, the trajectory planning module provides an optimal and collision-free reference trajectory. In addition, the computational effort for estimating the reference trajectory is reduced in comparison to e.g. occupancy grid techniques since no large grid needs to be processed with respect to occupancy, and instead the free space corridor may be represented e.g. based on a small number of geometrical elements like arcs and straight lines being represented by polynomials, for example. The computational effort for defining a collision-free space is therefore reduced e.g. in comparison to the occupancy grid technique, particularly for a high curvature of a road in front of the vehicle, since the number of required cells within the grid strongly increases when the occupancy grid technique is used.

The system may further comprise one or more of the following features. The trajectory planning module may determine if the deviation between the actual trajectory and the reference trajectory is greater than a predetermined threshold, and if the deviation is greater than the predetermined threshold, the trajectory planning module may determine a remaining steering intervention time and may estimate an updated reference trajectory based on the remaining steering intervention time. The goal point determination module may determine a primary goal point based on a maximum range of perception capability of the environment sensors and at least one backup goal point based on a reduced range being smaller than the maximum range of perception capability, and the trajectory planning module may estimate the reference trajectory based on the primary goal point and may check the reference trajectory with respect to dynamic constraints and to constraints related to the free space corridor. In addition, the trajectory planning module may estimate a revised reference trajectory based on the backup goal point if the reference trajectory being estimated based on the primary goal point violates the dynamic constraints or the constraints related to the free space corridor. The system may further comprise a lateral error determination module which determines a lateral error between a lateral position of the vehicle derived from the state of movement of the vehicle and an expected lateral position, and the goal point determination module may determine the at least one goal point additionally based on the lateral error. The trajectory control module may minimize the deviation between the actual trajectory and the reference trajectory of the vehicle by minimizing a cost function which is based on a single track model of the vehicle. Furthermore, the trajectory control module may estimate a compensating curvature which is applied to the actual trajectory in order to redirect the vehicle to the reference trajectory if the deviation between the actual trajectory and the reference trajectory of the vehicle increases. The vehicle state sensors may comprise a global positioning system and an inertial measurement unit, and/or the environment sensors may comprise an optical camera, a Radar system and/or a Lidar System.

The trajectory planning module may determine if the deviation between the actual trajectory and the reference trajectory is greater than a predetermined threshold. If the deviation is greater than the predetermined threshold, the trajectory planning module may determine a remaining steering intervention time and may estimate an updated reference trajectory based on the remaining steering intervention time. For the updated reference trajectory, the same at least one goal point is used as for the preceding reference trajectory. Therefore, the vehicle may be kept "on track" by updating the reference trajectory which may provide an improved lane keeping functionality. If the steering intervention time is smaller than a predefined time threshold, a driver of the vehicle has to take over control in order to guarantee safe driving.

According to an embodiment of the system, the goal point determination module determines a primary goal point based on a maximum range of perception capability of the environment sensors and at least one backup goal point based on a reduced range being smaller than the maximum range of perception capability. The trajectory planning module may estimate the reference trajectory based on the primary goal point and may check the reference trajectory with respect to dynamic constraints and to constraints related to the free space corridor. If the reference trajectory being estimated based on the primary goal point violates the dynamic constraints or the constraints related to the free space corridor, the trajectory planning module may estimate a revised reference trajectory based on the at least one backup goal point. By this means, safety of driving is improved by excluding a primary goal point which violates constraints regarding vehicle dynamics or the free space corridor. Reducing the range of trajectory planning by using the at least one backup goal point instead of the primary goal point for estimating the reference trajectory corresponds to reducing a time horizon being used for the trajectory planning. Due to the reduced time horizon an excessive increase of the deviation between the actual trajectory and the reference trajectory may be prevented at an early stage. Therefore, the computational effort for the further trajectory planning and trajectory control is decreased since e.g. less updated trajectories have to be estimated and the deviation between the actual trajectory and the reference trajectory can be easier minimized by the trajectory control module.

The system may further comprise a lateral error determination module which determines a lateral error between a lateral position of the vehicle derived from the state of movement and an expected lateral position. The goal point determination module may determine the at least one goal point additionally based on the lateral error. The expected lateral position may be the center of the lane on which the vehicle is driving and may be determined by the environment sensors, e.g. a camera detecting lane markers. Therefore, an additional input being similar to the input for traditional lane keeping assistance is provided for the goal point determination module and for the trajectory planning module. Thus, the reliability of the trajectory planning is increased.

The trajectory control module may minimize the deviation between the actual trajectory and the reference trajectory of the vehicle by minimizing a cost function which is based on a single track model of the vehicle. In addition, the trajectory control module may estimate a compensating curvature which is applied to the actual trajectory in order to redirect the vehicle to the reference trajectory if the deviation between the actual trajectory and the reference trajectory of the vehicle increases. By the compensating curvature the actual direction of driving of the vehicle is therefore corrected immediately if the vehicle starts to leave the reference trajectory.

The vehicle state sensors may comprise a global positioning system and an inertial measurement unit, whereas the environment sensors may comprise an optical camera, a Radar system and/or a Lidar system.

In another aspect, the present disclosure is directed at a method for estimating a trajectory of a vehicle. According to the method, a state of movement of the vehicle is detected by using vehicle state sensors, and an environment of the vehicle is monitored by using environment sensors. A free space corridor is determined based on the detected state of movement of the vehicle and based on the monitored environment of the vehicle, and at least one goal point for the trajectory to be estimated is determined based on the free space corridor. A reference trajectory is estimated based on the at least one goal point, and a deviation between an actual trajectory and the reference trajectory of the vehicle is calculated. The deviation between the actual trajectory and the reference trajectory of the vehicle is minimized and optimal control parameters for the movement of the vehicle are provided based the minimized deviation.

The detailed remarks and the advantages as mentioned above for the system according to the first aspect are also valid for the method. Especially, the computational effort for the trajectory planning step is reduced, for example, in comparison to using an occupancy grid technique, since the reference trajectory is estimated based on the free space corridor.

The method may further comprise one or more of the following features. Estimating the reference trajectory may further comprise: determining if the deviation between the actual trajectory and the reference trajectory is greater than a predetermined threshold, and if the deviation is greater than the predetermined threshold: determining a remaining steering intervention time, and estimating an updated reference trajectory based on the remaining steering intervention time. Determining at least one goal point further may further comprise: determining a primary goal point based on a maximum range of perception capability of the environment sensors and at least one backup goal point based on a reduced range being smaller than the maximum range of perception capability, estimating the reference trajectory based on the primary goal point and checking the reference trajectory with respect to dynamic constraints and to constraints related to the free space corridor, and estimating a revised reference trajectory based on the backup goal point if the reference trajectory being estimated based on the primary goal point violates the dynamic constraints or the constraints related to the free space corridor. In addition, the method may further comprise: determining a lateral error between a lateral position of the vehicle derived from the state of movement of the vehicle and an expected lateral position, and determining the at least one goal point additionally based on the lateral error. Minimizing the deviation between the actual trajectory and the reference trajectory of the vehicle may further comprise minimizing a cost function which is based on a single track model of the vehicle. Providing optimal control parameters for the movement of the vehicle may further comprise estimating a compensating curvature which is applied to the actual trajectory in order to redirect the vehicle to the reference trajectory if the deviation between the actual trajectory and the reference trajectory of the vehicle increases. Furthermore, the reference trajectory may be estimated only if a lateral acceleration of the vehicle is smaller than an acceleration threshold and if the at least one goal point is in compliance with predefined constraints. Determining the free space corridor in front of the vehicle may comprise applying a convex hull technique.

The detail remarks and advantages mentioned above for the embodiments of the system are also valid for the corresponding embodiments of the method. In addition, the reference trajectory may be estimated only if a lateral acceleration of the vehicle is smaller than an acceleration threshold and if the at least one goal point is in compliance with predefined constraints. Due to this condition for estimating the reference trajectory the safety of driving is enhanced since a driver has to take over control if these conditions are not fulfilled, and the method for estimating the trajectory of the vehicle is terminated. Furthermore, determining the free space corridor for the vehicle may comprise applying a convex hull technique. By this means, the determination of a collision-free trajectory of the vehicle is simplified, e.g. in comparison to using an occupancy grid technique.

In another aspect, the present disclosure is directed at a computer system configured to carry out several or all steps of the method described herein.

The computer system may comprise a processing unit, at least one memory unit and at least one non-transitory data storage. The non-transitory data storage and/or the memory unit may comprise a computer program for instructing the computer to perform several or all steps or aspects of the method described herein.

In another aspect, the present disclosure is directed at a non-transitory computer readable medium comprising instructions for carrying out several or all steps or aspects of the method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the method described herein.

As used herein, the term module may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The term module may include memory (shared, dedicated, or group) that stores code executed by the processor.

DRAWINGS

Figure 3B:
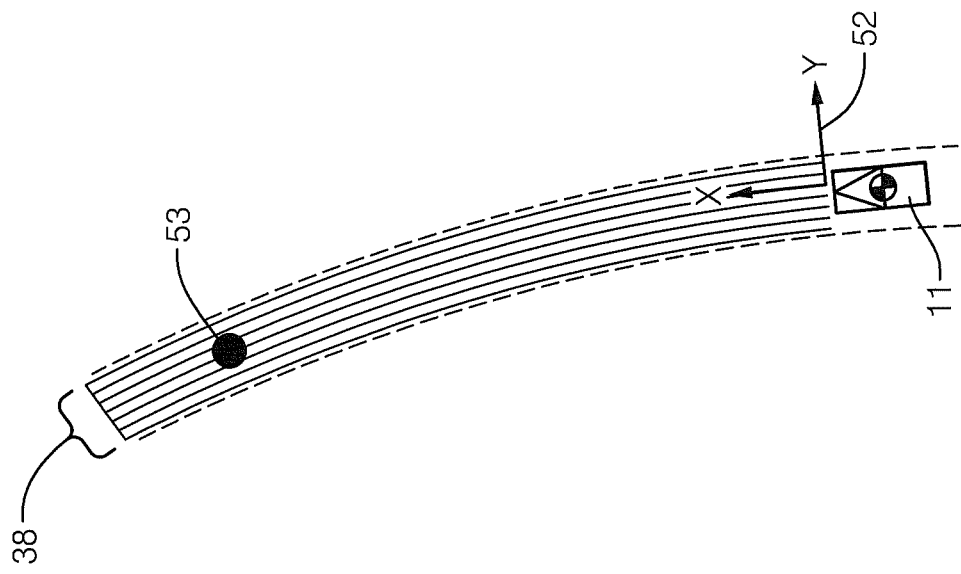
Figure 3A:
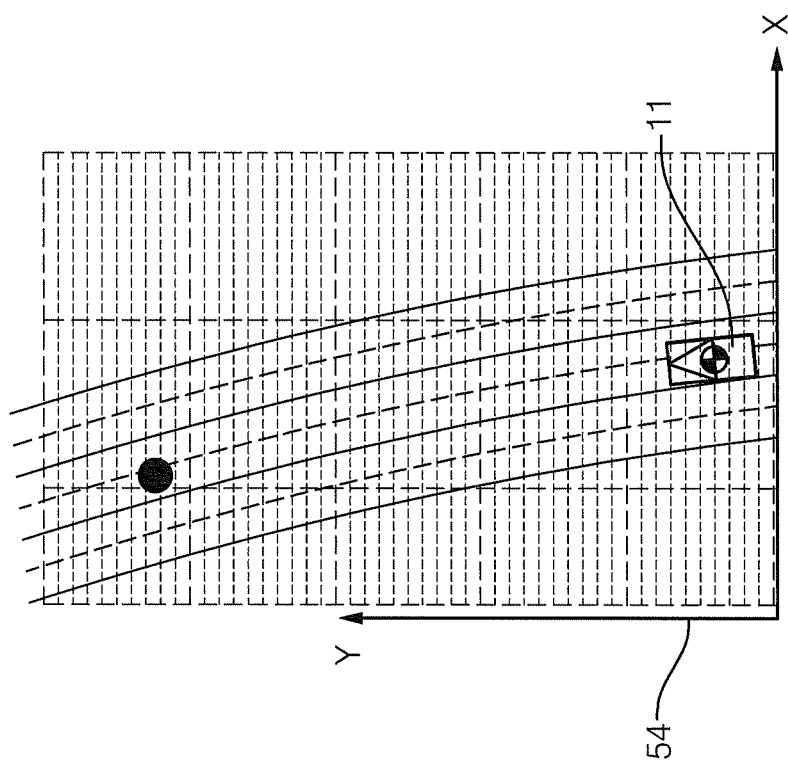
Figure 4C:
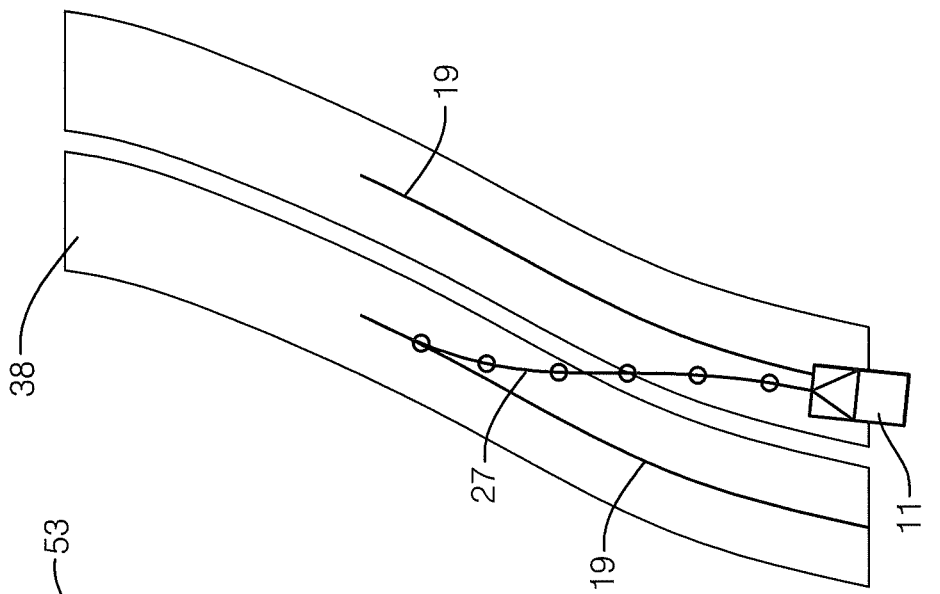
Figure 4B:
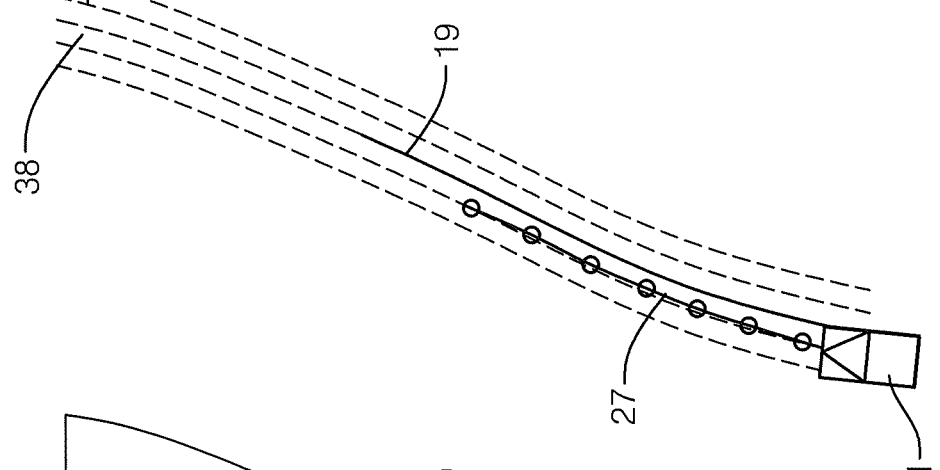
Figure 4A:
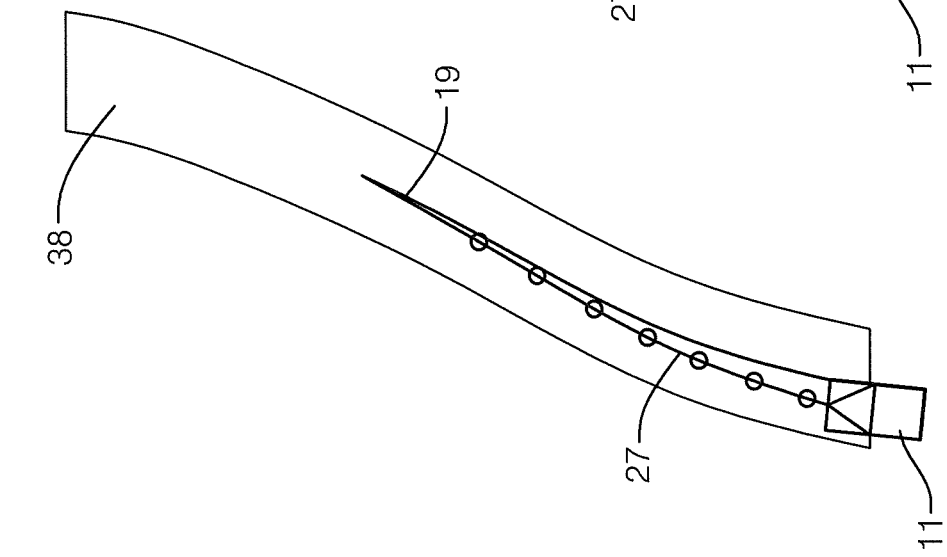
Figure 5:
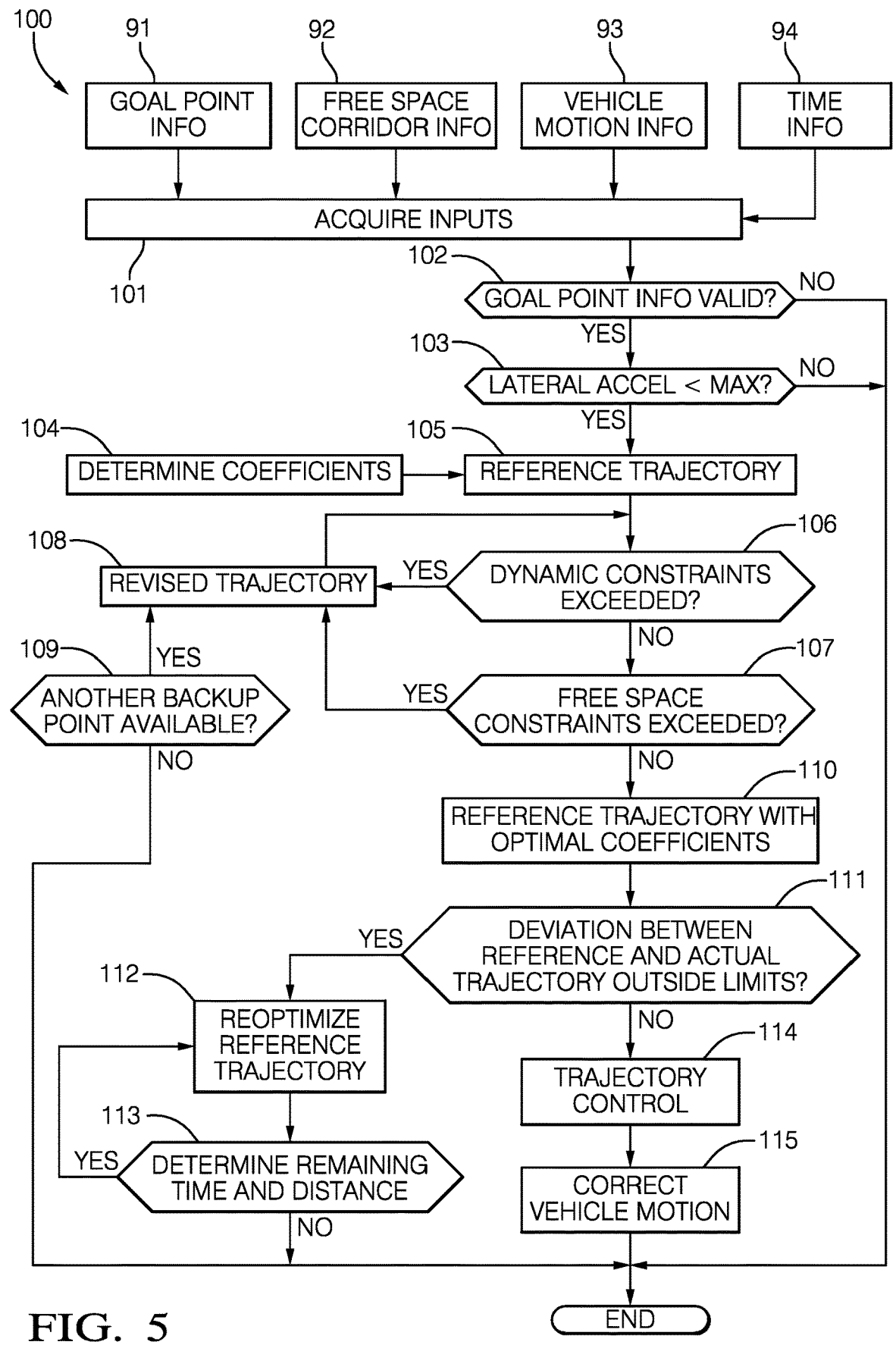
Figure 6:
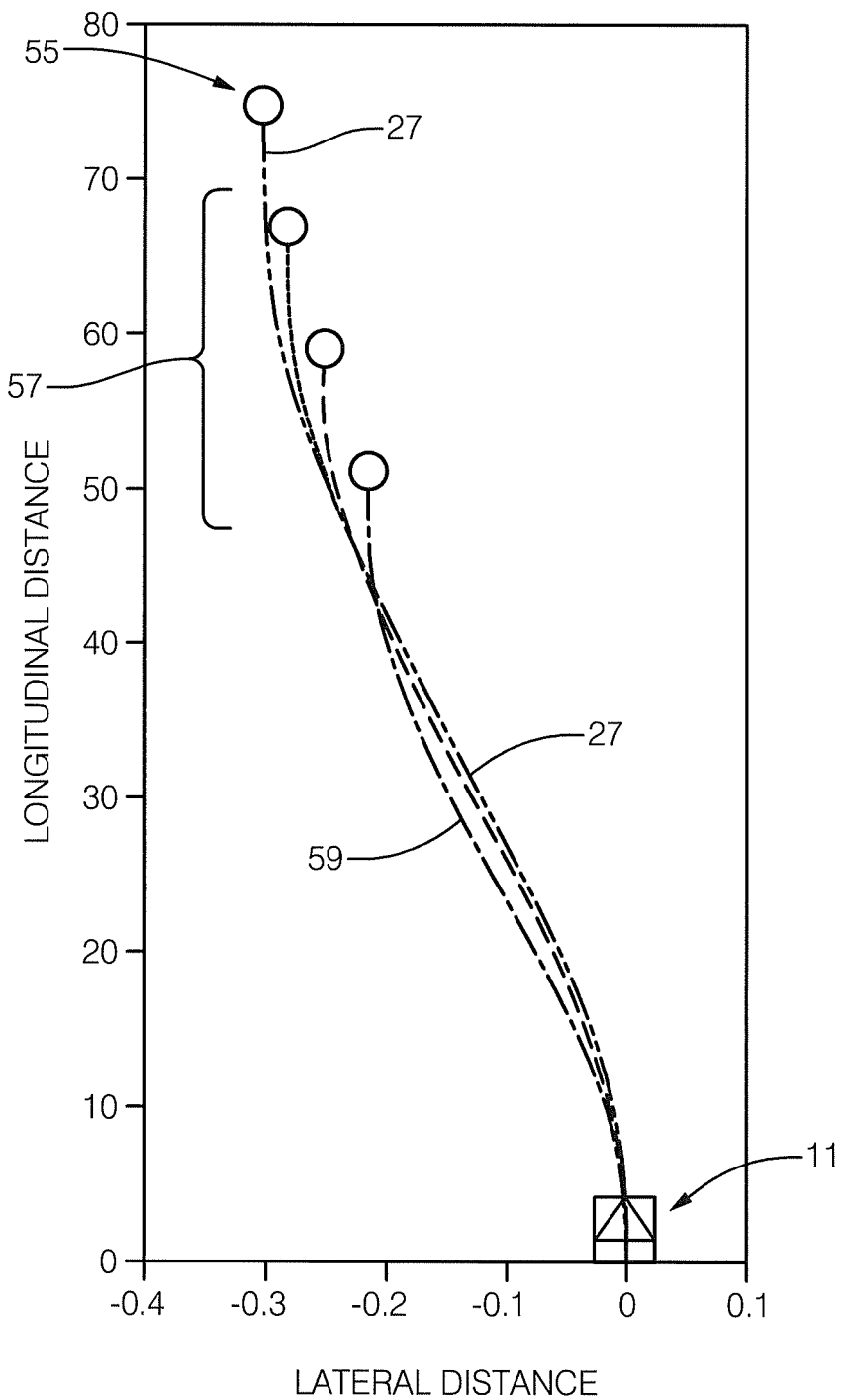
Figure 7B:
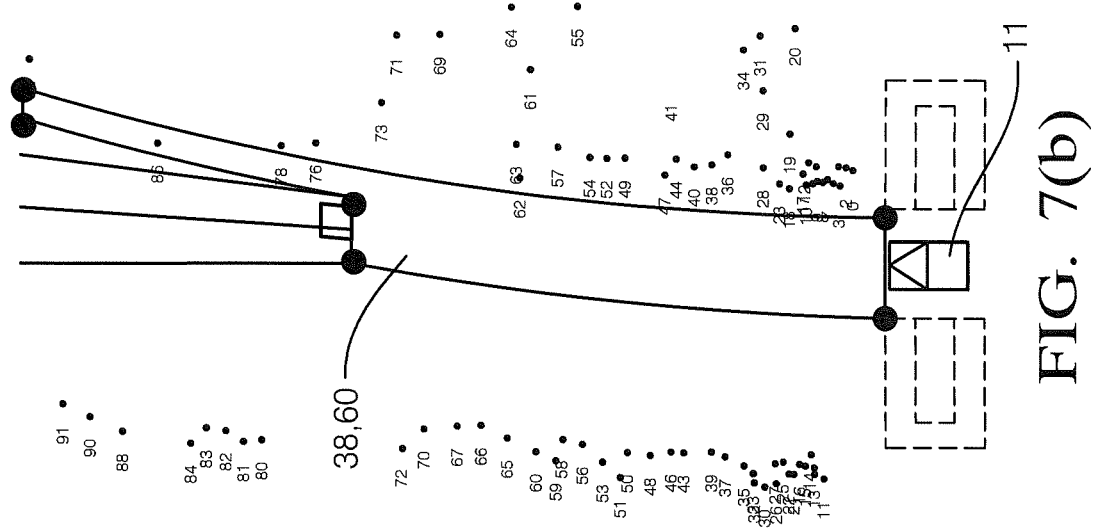
Figure 7A:
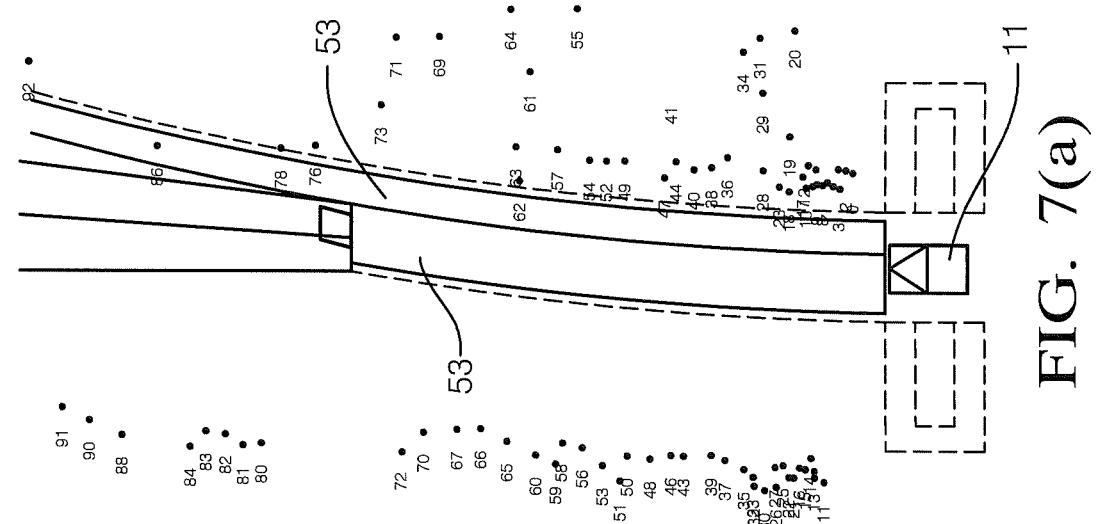
Figure 8:
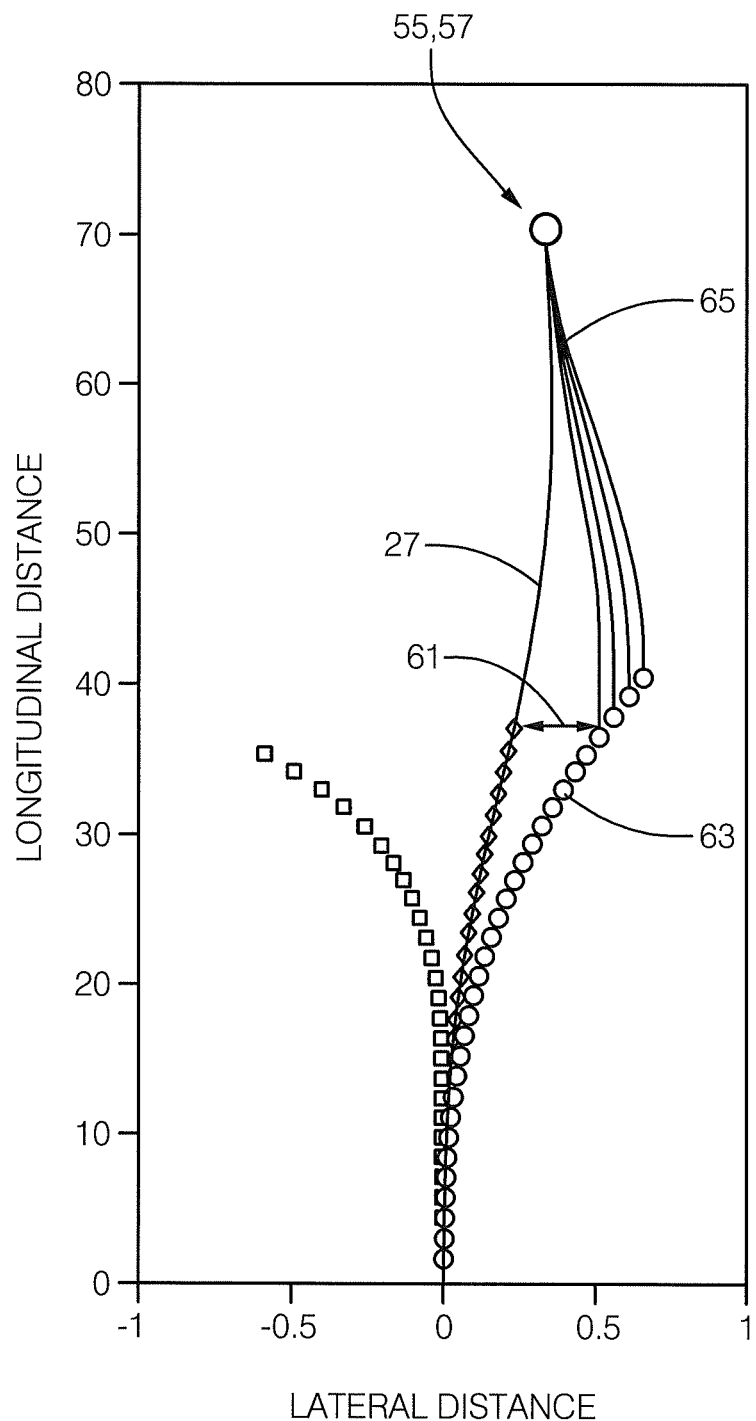
Figure 9A:
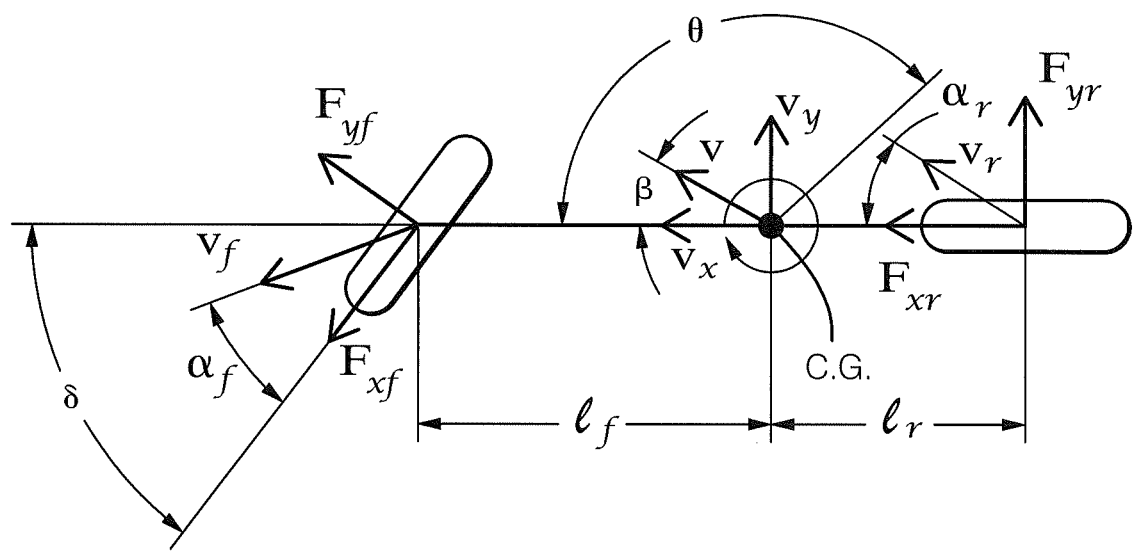
Figure 9B:
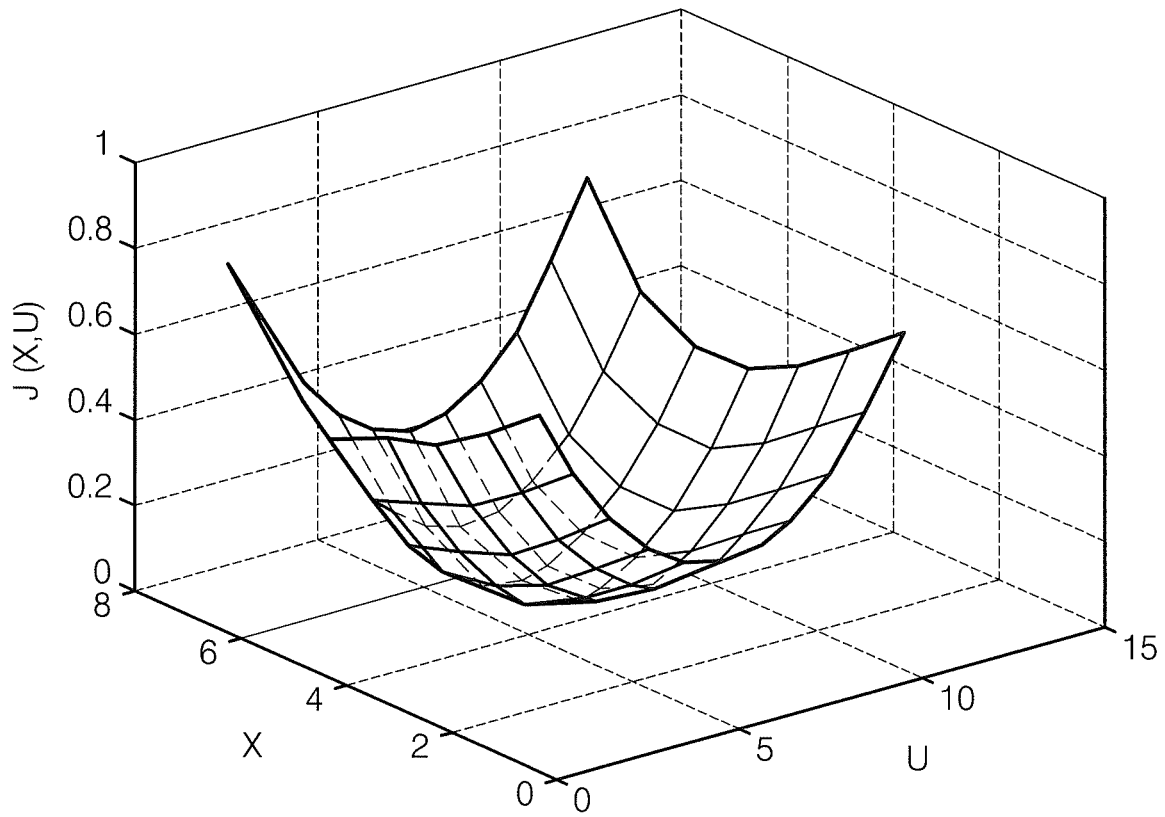
Figure 10B:
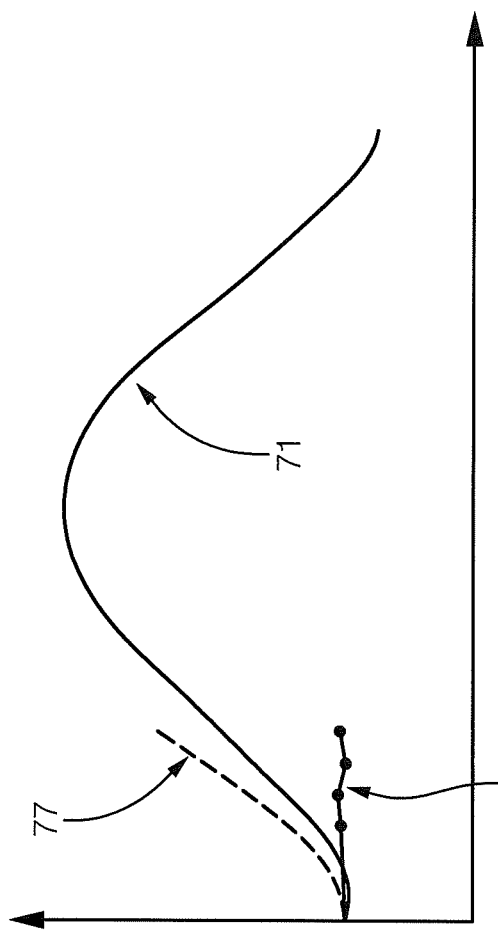
Figure 10C:
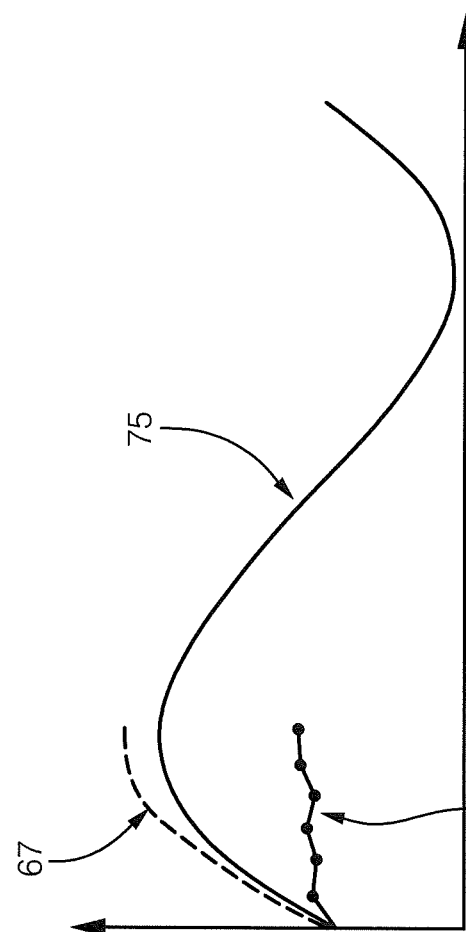
Figure 10A:
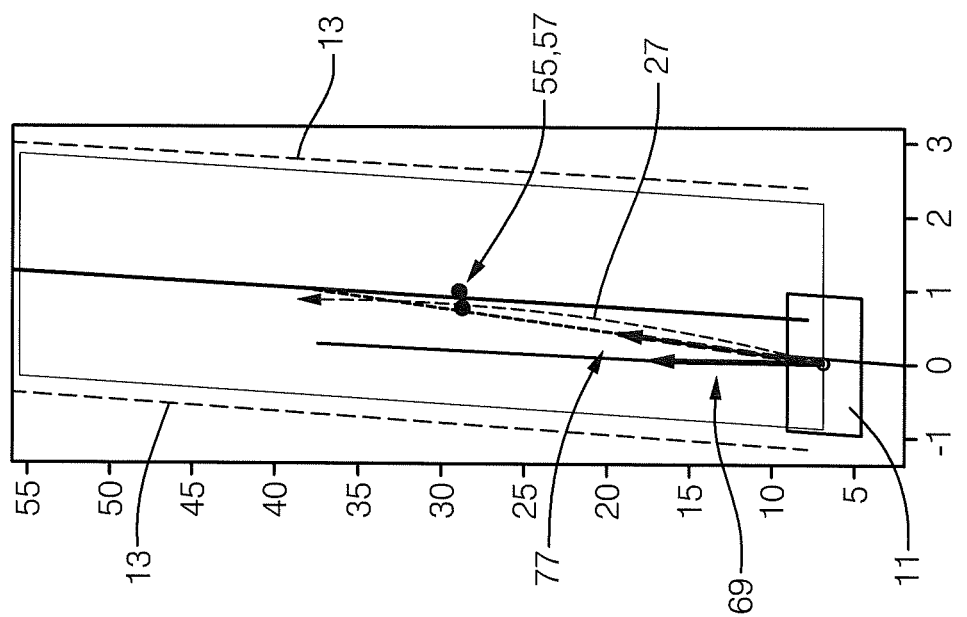

Exemplary embodiments and functions of the present disclosure are described below in conjunction with the following drawings, in which:

FIG. 1(a) depicts a lane keeping assistance functionality and an adaptive groove control functionality, FIG. 1(b) depicts trajectory planning for a host vehicle, FIG. 2 depicts a block diagram of a system for estimating a trajectory of a host vehicle, FIGS. 3(a)-(b) depict an occupancy grid concept in comparison to a free space corridor concept, FIGS. 4(a)-(c) depict examples for trajectory planning using a free space corridor, FIG. 5 depicts a flowchart of a method for estimating a trajectory of a host vehicle, FIG. 6 depicts trajectory planning based on a primary goal point and based on backup goal points, FIGS. 7(a)-(b) depicts a check of the reference trajectory using free space corridor constraints, FIG. 8 depicts a re-optimizing process for a trajectory, FIG. 9(a) depicts a single track model, FIG. 9(b) depicts a diagram of a cost function surface, and FIGS. 10(a)-(c) depicts the application of a compensating curvature.

DETAILED DESCRIPTION

In FIGS. 1(a) and 1(b), a host vehicle 11 is depicted which moves on a road between lane markers 13. The host vehicle 11 is provided with a lane keeping assistance functionality which is represented in FIG. 1(a) by an arrow 15 being aligned in lateral direction with respect to the road. In addition, the host vehicle 11 is provided with an adaptive cruise control functionality which is represented by an arrow 17 being aligned in a longitudinal direction, i.e. along the road. The aim of a conventional lane keeping assistance system is to keep the host vehicle 11 at a center 19 between the lane markers 13. On the other hand, an adaptive cruise control system tries to maintain a distance with respect to a further vehicle driving in front of the host vehicle 11 and therefore controls the longitudinal position and velocity of the host vehicle 11. A combination of longitudinal and lateral control by combining lane keeping assistance and adaptive cruise control is usually not provided since the host vehicle 11 tends to be under-controlled by such a simple combination of independent assistance systems.

Longitudinal and lateral control of the host vehicle 11 can be provided, however, by trajectory planning as depicted in FIG. 1(b). For the trajectory planning, a time horizon 21 is defined which corresponds to a range of perception capability of environment sensors 35 (see FIG. 2) being installed in the host vehicle 11. The environment sensors 35 comprise a camera, a Radar system and/or a Lidar system, for example.

The time horizon 21 being indicated by $T_p$ in FIG. 1(b) is divided into time increments 23 being indicated by dt in FIG. 1(b) in order to define nodes 25 for the trajectory planning. Each node 25 comprise a position $x_k$ in longitudinal direction, a position $y_k$ in lateral direction and a yaw angle $\psi_k$ of the host vehicle 11 at a time step k. Based on the nodes 25, a reference trajectory 27 is estimated via the trajectory planning. The movement of the host vehicle 11 is controlled by a suitable input for a vehicle motion control in order to be close to the reference trajectory 27.

FIG. 2 depicts an embodiment of a system 31 for estimating a trajectory of the host vehicle 11. The system comprises vehicle state sensors 33 which detect a state of movement of the host vehicle 11, i.e. a position, a speed, an acceleration and a yaw rate of the host vehicle 11. The vehicle state sensors 33 comprise, for example a global positioning system (GPS) and an inertial measurement unit (IMU). The system 31 further comprises environment sensors 35 which monitor the environment of the host vehicle 11, i.e. the position of lane markers and the free space in the direction of movement of the host vehicle 11. The free space can be determined by monitoring the position and speed of vehicles and obstacles surrounding of the host vehicle 11. As mentioned above, the environment sensors 35 can comprise an optical camera, a Radar system and/or a Lidar system.

The system 31 further comprises a free space module 37 and a lateral error determination module 39 which each receive a combined input from the vehicle state sensors 33 and from the environment sensors 35. The free space corridor module 37 determines a space being free of obstacles in the direction of movement of the host vehicle 11. This space is denoted as free space corridor 38 (see FIGS. 3, 4 and 7) and will be explained in detail below. The lateral error determination module 39 determines a lateral error with respect to the center 19 of the lane (see FIG. 1(b)) based on a position of lane markers 13 monitored by the environment sensors 35 and based on the state of movement of the host vehicle 11, i.e. its position and speed.

The free space corridor 38 determined by the free space module 37 and the lateral error determined by the lateral error determination module 39 are inputs for a goal point determination module 41 of the system 31. The goal point determination module 41 determines a primary goal point 55 (see FIG. 6) and backup goal points 57 which are inputs for a trajectory planning module 43 of the system 31. The primary goal point 55 is determined based on the full time horizon 21 (see FIG. 1(b)) being defined by the perception capability of the environment sensors 35, whereas the backup goal points 57 are determined based on a reduced time horizon being smaller than the full time horizon 21. The backup goal point 57 replace successively the primary goal point 55 in case that the primary goal point 55 turns out to be not suitable for trajectory planning as will be explained in detail below.

The trajectory planning module 43 estimates the reference trajectory 27 (see FIG. 1(b)) based on the primary goal point 55 or based on one of the backup goal points 57 (see FIG. 6). Furthermore, the trajectory planning module 43 calculates a deviation between the reference trajectory 27 and an actual trajectory of the host vehicle 11 being determined based on the output of the vehicle state sensors 33, e.g. based on the position and speed of the host vehicle 11. The determination of the deviation between the reference trajectory 27 and the actual trajectory of the host vehicle 11 is indicated by the node 44 in FIG. 2. If the deviation between the reference trajectory 27 and the actual trajectory of the host vehicle 11 is greater than a threshold 47, a trajectory re-optimization module 49 will be activated which is associated to the trajectory planning module 43 of the system 31. The trajectory re-optimization module 49 estimates an updated reference trajectory which is also called re-optimized trajectory for the remaining distance to the goal point being used for estimating the original reference trajectory 27. The re-optimization will be described in context with FIG. 8.

The system 31 further comprises a trajectory control module 45 which outputs control parameters for the movement of the vehicle to a vehicle motion control 51 being in communication with the system 31 for estimating the trajectory of the host vehicle 11. The output of the trajectory control module 45 which is also the output of the entire system 31 comprises parameters for the steering of the host vehicle 11, e.g. steering angle or steering torque.

As depicted in FIG. 3(b), the free space corridor 38 being determined by the free space module 37 is represented by a set of segments 53 extending along the road in the direction of movement of the host vehicle 11. Each segment 53 is defined by a set of vertices which are connected by straight lines or curved lines in order to follow the course of the road. In detail, four vertices of each segment 53 as shown in FIG. 3 (b) and FIG. 7 (a) are each connected by two straight lines in lateral direction, whereas two curved lines represented by a polynomial connect the vertices in longitudinal direction. Furthermore, the segments are discretized by a predefined distance in lateral direction. For example, each segment 53 has a width of 0.20 m in lateral direction. In longitudinal direction, each segment 53 ranges from the position of the host vehicle 11 to one or more detected objects or up to the range of perception of the environment sensors 35. In longitudinal direction, each segment 53 takes the curvature of the road into account.

The segments 53 are represented in a vehicle coordinate system 52. In contrast, an occupancy grid as shown in FIG. 3 (a) and being known from prior art is usually defined in a world coordinate system 54. Therefore, a coordinate transformation is required for the information from the occupancy grid if this information is to be used for trajectory planning of the host vehicle 11. In addition, a relatively large grid size being accompanied by a large number of cells has to be used for the occupancy grid technique in order to cover the whole area of interest for the host vehicle 11. That is, the occupancy grid needs a large amount of data for its representation which requires a corresponding large memory.

Therefore, the set of segments 53 representing the free space corridor 38 (see FIG. 3 (b)) requires a much lower computational effort, i.e. less memory due to the reduced data volume and less processing since no coordinate transformations are required in comparison to the occupancy grid technique.

Examples for the use of the segments 53 representing the free space corridor 38 are shown in FIG. 4(a)-(c). The free space corridor 38 is applied for lane centering (a) or lane biasing (b) with respect to the center 19 of the lane wherein the host vehicle 11 follows the reference trajectory 27 being estimated by the system 31. A further example is lane changing as shown in (c). In this case, the reference trajectory 27 leads the host vehicle 11 to a center 19 of an adjacent lane.

FIG. 5 depicts a flowchart of a method 100 for estimating a trajectory of a vehicle. The method steps are performed by the trajectory planning module 43 and the trajectory control module 45 as shown in FIG. 2.

In step 101, inputs are acquired which are necessary to carry out the method 100. These inputs comprise goal point information 91 being provided by the goal point determination module 41 (see FIG. 2), free space corridor information 92 provided by the free space module 37, vehicle motion information 93 provided by the vehicle state sensors 33 and time information 94 for a global time synchronization. This information 94 may comprise time stamp information from a GPS system or from an IMU system. The goal point information 91 comprises the primary goal point 55 and a predefined number of backup goal points 57 (see FIG. 6) as an output of the goal point determination module 41.

In steps 102 and 103, a validation of a part of the input is performed which is received at step 101. At step 102, the received goal point information 91 is validated by checking if the goal points required for the trajectory planning are existing and available. For example, it is checked if the primary goal point 55 (see FIG. 6) or at least one backup goal point 57 are provided by the goal point determination module 41 which determines goal points only which are located within the free space corridor 38. Therefore, the goal point determination module 41 might not be able to find goal points having a reasonable position within the free space corridor 38. In this case, goal point information 91 provided by the goal point determination module 41 is an empty data set and the examination fails at step 102.

At step 103, the current lateral acceleration of the host vehicle 11 is compared with a maximum lateral acceleration which may be predefined for the host vehicle 11. For example, an upper limit for the lateral acceleration with respect to comfortable driving is 0.3 g.

If the examination of the goal points fails at step 102 or if the current lateral acceleration is greater than the predefined maximum lateral acceleration at step 103, the trajectory planning is terminated and a driver of the host vehicle 11 has to take over control. In the latter case, i.e. if the current lateral acceleration is greater than the maximum lateral acceleration, the host vehicle 11 is driving too fast for the system 31 and the method 100 to provide a feasible trajectory output.

At steps 104 and 105, the reference trajectory 27 is estimated based on the primary goal point 55 which corresponds to the maximum range of perception capability of the environment sensors 35. The reference trajectory 27 can be represented by a fifth order polynomial for the longitudinal and for the lateral position, respectively, of the host vehicle 11. In detail, the longitudinal position px(t) and the lateral position py(t) for a given time t is represented by the following equations:

$$\begin{bmatrix} px(t) \\ py(t) \end{bmatrix} = \begin{bmatrix} a_0 + a_1 t + a_2 t^2 + a_3 t^3 + a_4 t^4 + a_5 t^5 \\ b_0 + b_1 t + b_2 t^2 + b_3 t^3 + b_4 t^4 + b_5 t^5 \end{bmatrix} \quad (1)$$

The coefficients $a_0$ to $a_5$ and $b_0$ to $b_5$ are determined at step 104 by using an initial condition $(px_0, py_0, t_0)$ representing the current position of the host vehicle 11 for the time to and using a final condition $(px_f, py_f, t_f)$ representing the primary goal point which is to be reached at the time $t_f$. In addition, the coefficients $a_0$ to $a_5$ and $b_0$ to $b_5$ are subjected to the further condition of minimizing a planning cost function which is defined by:

$$J = \int_0^{T_f} \ddot{p}x(t)^2 + \ddot{p}y(t)^2 dt \quad (2)$$

At steps 106 to 109, the reference trajectory 27 being estimated based on the primary goal point 55 is checked for violation of certain constraints. If one of these constraints is violated, a revised reference trajectory is estimated based on the first of the backup goal points 57 (see FIG. 6). In addition, this process of checking the reference trajectory and estimating a further revised reference trajectory based on the next backup goal point is repeated iteratively.

At step 106, the reference trajectory being estimated based on the primary goal point is checked against dynamic constraints. The dynamic constraints comprise minimum and maximum limits of the velocity and the acceleration in longitudinal and lateral direction for the host vehicle 11. If one of these constraints is violated, i.e. if the velocity or the acceleration of the host vehicle 11 is greater than one of these limits along the reference trajectory, a revised reference trajectory will be estimated based on the first backup goal point 57 which has a reduced distance with respect to the current position of the host vehicle 11 in comparison to the primary goal point 55 (see FIG. 6). The use of the first backup goal point 57 instead of the primary goal point 55 corresponds to a reduction of the time horizon 21 (see FIG. 1) being used for the estimation of the reference trajectory 27, i.e. for trajectory planning.

The revised reference trajectory is estimated as step 108, and it is also checked for violation of the dynamic constraints at step 106. If the dynamic constraints are still violated, a further revised trajectory is estimated as step 108 based on the next backup goal point 57 having a further reduced distance with respect to the current position of the host vehicle 11 in comparison to the first backup goal point 57 (see FIG. 6). That is, the time horizon for the trajectory planning is reduced again by using the next backup goal point 57. Thereafter, the further revised trajectory is checked again for violation of the dynamic constraints at step 106. That is, this process is repeated iteratively until the dynamic constraints are not violated any more or until there is no further backup goal point 57.

The check if a further backup goal point 57 is available is performed at step 109. That is, before the next revised trajectory is estimated at step 108, the existence of the next backup goal point 57 is checked. If it is determined at step 109 that no further backup goal point 57 is available, the method will be not able to plan a feasible trajectory. In this case, the method is terminated and the driver of the host vehicle 11 has to take over control.

At step 107, the reference trajectory which is in compliance with the dynamic constraints is checked for a violation of free space corridor constraints. For this check, the segments 53 are used which are a representation of the free space corridor 38 as described above in context of FIGS. 3 and 4. For performing the free space corridor check, a convex hull technique is used to find the boundary constraints of the entire free space corridor 38 represented by the segments 53. As depicted in FIG. 7, for the entirety of the segments 53 shown at (a), a convex hull 60 is determined which is shown at (b). The convex hull 60 can be represented by an integrated segmentation via a single set of vertices as depicted in FIG. 7 (b).

In detail, the set of segments 53 shown in FIG. 7 (a) is determined first as described above (see FIG. 3 (b)) by considering possible obstacles for the host vehicle 11 which are denoted by the small two-digit numbers in FIGS. 7 (a) and 7 (b). The convex hull 60 is wrapped around the entire set of segments 53 and comprises a set of points which specify the boundary of the free space corridor 38 as follows:

$$\sum_{(j)=1}^{M} x_{FR}^{(j)} = \underline{X}_{FR} \quad (3)$$

$$\sum_{(j)=1}^{M} y_{FR,L}^{(j)} = \underline{Y}_{FR,L}$$

$$\sum_{(j)=1}^{M} y_{FR,R}^{(j)} = \underline{Y}_{FR,R}$$

wherein $x_{FR}^{(j)}$ represents the set of arc lines in the longitudinal direction for the segment j, M is the total numbers of segments, $y_{FR,L}^{(j)}$ and $y_{FR,R}^{(j)}$ are the set of left and right lateral boundaries of each segment, respectively, $\underline{X}_{FR}$ is the convex hull of the set of longitudinal arc lines, $\underline{Y}_{FR,L}$ and $\underline{Y}_{FR,R}$ are the convex hull of the set of left and right lateral boundary of whole segment.

The reference trajectory 27 being output of step 106 is checked for the free space corridor 38 represented by the convex hull 60, i.e. it is checked if the reference trajectory 27 is located within the limits given by the area defined by the convex hull 60. If yes, the movement of the host vehicle along the trajectory will be free of collisions.

If the reference trajectory violates the free space corridor constraints, a revised reference trajectory is estimated again based on the next backup goal point at step 108. This reference trajectory being estimated based on the next backup goal point 57 is checked again for violation of the dynamic constraints at step 106. Thus, the check for violation of the free space corridor constraints is also iterated in the same manner using the next backup goal point 57 as described above for the check with respect to the dynamic constraints at step 106.

The reference trajectory which passes both checks for constraints at steps 106 and 107 and therefore fulfils all constraints can be regarded as trajectory having optimal coefficients of the fifth order polynomial defined above in formula (1). This set of optimal coefficients can be denoted by $$\underline{\alpha} = \{a_0, a_1, a_2, a_3, a_4, a_5\}$$

$$\underline{\beta} = \{b_0, b_1, b_2, b_3, b_4, b_5\} \quad (4)$$

These sets $\underline{\alpha}, \underline{\beta}$ of coefficients can be regarded as vectors describing the longitudinal and lateral component of the reference trajectory 27 (see FIG. 1). In step 110, the optimal coefficients of the reference trajectory are therefore output for the steps of re-optimizing the reference trajectory at step 112, if required, and for the steps of trajectory control, i.e. steps 114 and 115.

At step 111, the reference trajectory 27 having the optimal coefficients as described above is checked for a deviation with respect to an actual trajectory or motion of the host vehicle 11 which is derived from the output provided by the vehicle state sensors 33 (see FIG. 2). In order to calculate the deviation between the reference trajectory and the actual trajectory of the host vehicle 11, the propagation of the reference trajectory can be described for a sampling time $\Delta k$ by the following transition matrix:

$$\Phi = \begin{bmatrix} 1 & \Delta k & \Delta k^2 & \Delta k^3 & \Delta k^4 & \Delta k^5 \\ 0 & 1 & 2\Delta k & 3\Delta k^2 & 4\Delta k^3 & 5\Delta k^4 \\ 0 & 0 & 2 & 6\Delta k & 12\Delta k^2 & 20\Delta k^3 \\ 0 & 0 & 0 & 6 & 24\Delta k & 60\Delta k^2 \\ 0 & 0 & 0 & 0 & 0 & 0 \\ 0 & 0 & 0 & 0 & 0 & 0 \end{bmatrix} \quad (5)$$

The sampling time $\Delta k$ corresponds to a current time stamp which is part of the time information 94 being input by the vehicle state sensors 33, e.g. a GPS and a IMU system. The reference trajectory for the sampling time $\Delta k$ can be determined as:

$$\underline{PX}(t) = \Phi \cdot \underline{\alpha} \quad (6)$$

$$\underline{PY}(t) = \Phi \cdot \underline{\beta}$$

$$\underline{PX}(t) = \begin{bmatrix} \hat{px}(t) & \hat{\dot{px}}(t) & \hat{\ddot{px}}(t) & \hat{\dddot{px}}(t) \end{bmatrix}^T$$

$$\underline{PY}(t) = \begin{bmatrix} \hat{py}(t) & \hat{\dot{py}}(t) & \hat{\ddot{py}}(t) & \hat{\dddot{py}}(t) \end{bmatrix}^T$$

$\underline{PX}, \underline{PY}$ are vectors of the estimated reference trajectory 27 for the longitudinal and lateral direction, respectively, and comprise the position, the velocity, the acceleration and the jerk of the planned motion of the host vehicle 11.

As mentioned above, the actual trajectory of the host vehicle 11 can be determined by the output of the vehicle state sensors 33, and respective vectors corresponding to $\underline{PX}, \underline{PY}$ can be determined by a synchronization with the time information 94 (see FIG. 2) and the sampling time $\Delta k$. The reference trajectory 27 and the actual trajectory of the host vehicle 11 are compared in order to calculate a deviation between these trajectories for a given time t. The deviation between the trajectories is compared with a predefined threshold at step 111.

The deviation between the reference trajectory 27 and the actual trajectory of the host vehicle 11 can be described by the following deviation vector:

$$e(t) = \begin{bmatrix} e_x(t) \\ e_y(t) \\ e_\psi(t) \end{bmatrix} = \begin{bmatrix} \hat{px}(t) - px(t) \\ \hat{py}(t) - py(t) \\ \operatorname{atan}\left(\dfrac{\hat{dy}}{\hat{dx}}\right) - \psi(t) \end{bmatrix} \quad (7)$$

The deviation vector e(t) for the instantaneous time t comprises a longitudinal distance deviation $e_x(t)$, a lateral distance deviation $e_y(t)$ and a yaw angle deviation $e_\psi(t)$, respectively.

Next, a remaining steering intervention time as well as a remaining longitudinal distance to the primary or backup goal point 55, 57 being used for the reference trajectory is calculated. In detail, the remaining steering intervention time and the remaining longitudinal and lateral distances are calculated as follows:

$$\Delta t_r = t_f - t \quad (8)$$

$$\begin{bmatrix} \Delta px \\ \Delta py \end{bmatrix} = \begin{bmatrix} px_g - px(t) \\ py_g - py(t) \end{bmatrix}$$

$px_g$ and $py_g$ are the longitudinal and the lateral coordinates of the primary or backup goal point 55, 57 being used for the calculation of the reference trajectory in the vehicle coordinate system, and px(t) and py(t) describe the feedback for the motion of the host vehicle 11. $t_f$ is the total steering intervention time, i.e. the time the host vehicle needs to arrive at the primary or backup goal point 55, 57. The remaining steering intervention time $\Delta t_f$ and the remaining distances are calculated at step 113 where it is decided if the remaining time and distances are sufficient in order to re-optimize the reference trajectory. If the remaining time and the remaining distances are not sufficient, the method is terminated and the driver of the vehicle has to take over control.

If there is sufficient remaining time for steering intervention and if the distances to the primary or backup goal point 55, 57 are also sufficient, a re-optimization of the reference trajectory will be performed at step 112. For the re-optimization, a new reference trajectory is estimated for the remaining steering intervention time using the same primary or backup goal point 55, 57 as for the original reference trajectory 27 for which the optimal coefficients are output at step 110. That is, for the remaining steering intervention time new optimal coefficients $a_0$ to $a_5$ are calculated in order to redirect the host vehicle 11 to the primary or backup goal point under consideration.

The process of re-optimizing the trajectory is depicted schematically in FIG. 8. In the middle, the reference trajectory 27 and the optimal position for the host vehicle 11 are shown. If the deviation between the motion of the host vehicle 11 and the reference trajectory becomes greater than the predefined threshold, the system 31 will try to re-optimize the trajectory. For the example as shown in FIG. 8, the predefined threshold is 0.5 m. Therefore, if the deviation 61 shown on the right side of the reference trajectory 27 becomes greater than 0.5 m, the system 31 checks if there is sufficient steering intervention time for the re-optimization. For the deviation 61 between the reference trajectory 27 and the trajectory 63 for the motion of the host vehicle 11 (see the right side of FIG. 8) the steering intervention time and the distances to the primary or backup goal point 55, 57 are sufficient for the estimation of a re-optimized trajectory 65 which redirects the host vehicle 11 to the primary or backup goal point. In contrast, for the deviation shown on the right side of the reference trajectory 27, the remaining steering intervention time is not sufficient and therefore no re-optimization can be performed. The trajectory on the right side of FIG. 8 demonstrates where the host vehicle will end up if additionally no control input is provided by the driver.

If the deviation between the reference trajectory 27 and the motion of the host vehicle 11 is lower than the predefined threshold at step 111, trajectory control will be performed based on the use of a single track model (see FIG. 9 (a)) by the trajectory control module 45 (see FIG. 2). The trajectory control is performed at step 114 and tries to minimize the deviation between the reference trajectory and the motion of the host vehicle 11 by minimizing a cost function as described below.

According to the single track model, a vector $\chi$ is defined as $[e_y, \dot{e}_y, e_\psi, \dot{e}_\psi]$, wherein $e_y$ and $\dot{e}_y$ are the lateral deviation and its rate, and wherein $e_\psi$ and $\dot{e}_\psi$ are the yaw deviation and the yaw rate deviation with respect to the reference trajectory, respectively. An equation of motion for the deviation can be formulated as $$\ddot{e}_y = \dot{e}_y\left[-\frac{2c_f}{mv_x} - \frac{2c_r}{mv_x}\right] + e_\psi\left[\frac{2c_f}{m} + \frac{2c_r}{m}\right] + \quad (9)$$

$$\dot{e}_\psi\left[-\frac{2c_f l_f}{mv_x} + \frac{2c_r l_r}{mv_x}\right] + \psi^*\left[-\frac{2c_f l_f}{mv_x} + \frac{2c_r l_r}{mv_x}\right] + \frac{2c_f \delta}{m} + g\sin\Phi$$

$$\ddot{e}_\psi = \dot{e}_y\left[-\frac{2c_f l_f}{I_z v_x} + \frac{2c_r l_r}{I_z v_x}\right] + e_\psi\left[\frac{2c_f l_f}{I_z} - \frac{2c_r l_r}{I_z}\right] +$$

$$\dot{e}_\psi\left[-\frac{2c_f l_f^2}{I_z v_x} - \frac{2c_r l_r^2}{I_z v_x}\right] + \psi^*\left[-\frac{2c_f l_f^2}{I_z v_x} + \frac{2c_r l_r^2}{I_z v_x}\right] + \frac{2c_f l_f \delta}{I_z}$$

In these formulas, m is the mass of the vehicle, $v_x$ is the longitudinal velocity (see FIG. 9 (a)), $I_z$ is the yaw moment of inertia of the vehicle, $\psi^*$ is a desired yaw rate with respect to the road curvature, $\delta$ is a steering angle, $c_f$ and $c_r$ are a respective corning compliance for the front and rear tire, respectively, and $l_f$ and $l_r$ are the respective distances from a center of gravity (c.g.) of the vehicle to the front and rear axles, respectively. Furthermore, $\Phi$ is an input road angle and g is the gravitational acceleration.

The equation of motion (9) can be vectorized as follows by introducing a state transmission matrix A and input matrices B, $B_\psi$ and $B_\Phi$:

$$\dot{\chi} = A\chi + B\delta + B_\psi \Psi^* + B_\Phi \sin\Phi$$

$$A = \begin{bmatrix} 0 & 1 & 0 & 0 \\ 0 & -\frac{2(c_f + c_r)}{mv_x} & \frac{2(c_f + c_r)}{m} & -\frac{2(l_f c_f - l_r c_r)}{mv_x} \\ 0 & 0 & 0 & 1 \\ 0 & -\frac{2(l_f c_f - l_r c_r)}{I_z v_x} & \frac{2(l_f c_f - l_r c_r)}{I_z} & -\frac{2(l_f^2 c_f + l_r^2 c_r)}{I_z v_x} \end{bmatrix} \quad (10)$$

$$B = \begin{bmatrix} 0 \\ \frac{2c_f}{m} \\ 0 \\ \frac{2l_f c_f}{I_z} \end{bmatrix}$$

$$B_\Psi = \begin{bmatrix} 0 \\ -\frac{2l_f c_f - 2l_r c_r}{mv_x} - v_x \\ 0 \\ -\frac{2l_f^2 c_f + 2l_r^2 c_r}{I_z v_x} \end{bmatrix}$$

$$B_\Phi = \begin{bmatrix} 0 \\ g \\ 0 \\ 0 \end{bmatrix}$$

An optimal control output may be determined based on a Model Predictive Control scheme which tries to diminish the deviation at a steady state in which the influence of the road curvature $B_\Psi$ and of the road angle $B_\Phi$ is excluded. In order to derive the cost function, a prediction according to the Model Predictive Control scheme can be formulated as follows:

$$\xi_k = M\chi_k + \Theta u_k$$

$$M = \begin{bmatrix} A \\ A^2 \\ \vdots \\ A^N \end{bmatrix} \quad (11)$$

$$\Theta = \begin{bmatrix} B & 0 & \ldots & 0 \\ AB & B & \ldots & 0 \\ \vdots & \vdots & \ddots & \vdots \\ A^{N-1}B & A^{N-2}B & \ldots & B \end{bmatrix}$$

The matrix M is a convolution matrix of the state transition matrix A as defined in (10) and describes the predictive horizon (N steps) of the state of the vehicle, and $\Theta$ is a collective controllability matrix based on the matrices A and B as also defined in (10). $u_k$ corresponds to the steering angle $\delta$ at the time step k.

A cost matrix q for weighting each deviation state (vector $\chi$ as defined in context of (9)) can be defined at a predicted time horizon N by the following equation:

$$q = \begin{bmatrix} q_{e_y} & 0 & 0 & 0 \\ 0 & q_{\dot{e}_y} & 0 & 0 \\ 0 & 0 & q_{e_\Psi} & 0 \\ 0 & 0 & 0 & q_{\dot{e}_\Psi} \end{bmatrix} \quad (12)$$

$$Q = C^t q C$$

$$\tilde{Q} = \begin{bmatrix} Q & 0 & \ldots & 0 \\ 0 & \ddots & & \vdots \\ \vdots & & Q & 0 \\ 0 & \ldots & 0 & Q \end{bmatrix}$$

$\tilde{Q}$ represents a cost matrix of states at for the whole predicted time horizon N, and C denotes an output matrix. Furthermore, an input rate matrix at the predicted horizon can be defined as:

$$R = r_u \quad (13)$$

$$\tilde{R} = \begin{bmatrix} R & 0 & \ldots & 0 \\ 0 & \ddots & & \vdots \\ \vdots & & R & 0 \\ 0 & \ldots & 0 & R \end{bmatrix}$$

By calculating a Hessian matrix of the cost function and an coefficient vector F of the linear part of the function as follows $$H = C^T \tilde{Q} C + \tilde{R}$$

$$F = C^t \tilde{Q} M \quad (14)$$

a quadratic cost function can be formulated for an optimization problem as $$J_k = u_k^T H u_k + 2 x_k^T F u_k \quad (15)$$

An example for a quadratic cost function is shown in FIG. 9(b). The minimization of the cost function can be formulated as follows:

$$\frac{1}{2} u^T H u + F^T u \to \min \quad (16)$$

subjected to $$A_c u_k \le b_c + B_c x_k$$

$A_c$ is an concatenation of an equality and inequality constraint matrix, $b_c$ is a state constraint $[\chi_{ub}, \chi_{lb}]$, wherein $\chi_{ub}$ is a upper boundary of the deviation state vector, $\chi_{lb}$ is a lower boundary of the deviation state vector, $B_c$ is a concatenation of the state transition matrix at each predictive horizon $[-A_n, A_n]$ and n is the associated predictive horizon (n steps).

The result of the minimization provides an optimal control output for the vehicle motion control 51 (see FIG. 2) which can be represented as follows:

$$u^*(k) = \arg\min_u J(k) \quad (17)$$

In addition, based on the single track model a compensation for the steering angle $\delta$ may be derived as follows:

$$\delta_{FF} = \frac{l_f + l_r}{RoC} + \left( \frac{\frac{m l_r}{l_f + l_r}}{2 c_f} - \frac{\frac{m l_f}{l_f + l_r}}{2 c_r} \right) a_y^* \quad (18)$$

$$a_y^* = \Psi^{*2} RoC + g \sin \Phi$$

$\delta_{FF}$ is a feed forward steering angle, RoC is the radius of curvature, $a_y^*$ is a desired lateral acceleration, $\Psi^*$ is the desired yaw rate, and $\Phi$ is the road angle.

At block 115, a compensating curvature 67 (see FIG. 10) is generated in order to correct the motion of the host vehicle 11 with respect to the reference trajectory 27. In FIG. 10 (a), the movement of the host vehicle 11 between the lake markers 13 is shown, whereas FIG. 10 (b) depicts a direction 69, 71 (i.e. an angle with respect to a straight movement at a steering angle of zero) of the host vehicle 11 and of the reference trajectory 27, respectively, and FIG. 10 (c) depicts a curvature 73, 75 of the movement of the host vehicle 11 and of the reference trajectory 27. The directions 69, 71 and the curvatures 73, 75 are depicted in arbitrary units over time. In addition, a compensating direction 77 and the compensating curvature 67 are shown in FIG. 10 (b) and FIG. 10 (c), respectively.

In a normal situation, the host vehicle 11 should track the reference trajectory 27. If the motion of the host vehicle 11 starts to deviate from the reference trajectory 27, i.e. if a current direction 69 and a current curvature 73 of the vehicle motion deviates from the direction 71 and the curvature 75 of the reference trajectory as shown at FIGS. 10 (b) and (c), respectively, a compensating direction 77 and the compensating curvature 67 are calculated in order to compensate the current direction 69 and the current curvature 73 and to redirect the host vehicle 11 to the reference trajectory 27 as shown in FIG. 10 (a).

Based on the single track model, the compensation curvature 67 may be calculated as:

$$\kappa^* = \tan\left( \frac{u^* + \delta_{FF}}{l_f + l_r} \right) \quad (19)$$

The direction of the host vehicle 11 is defined by the steering angle of the vehicle. As shown in FIG. 10 (a), the steering angle is almost zero. Correspondingly, the current direction 69 and the current curvature 73 of the host vehicle 11 are almost constant. By taking the compensating curvature 67 and the compensating direction 77 into account, the actual trajectory of the host vehicle 11 is again directed to the goal point 55, 57, i.e. to the primary goal point 55 or to one of the backup goal points 57 being described above.

TABLE 1

Glossary of Terms Used Above

| Abbreviation | Description | Unit |
|---|---|---|
| $px_0$ | initial longitudinal position | m |
| $py_0$ | initial lateral position | m |
| $t_0$ | initial time | s |
| $px_f$ | final longitudinal position | m |
| $py_f$ | final lateral position | m |
| $t_f$ | final time | s |
| $a_0, a_1, a_2, a_3, a_4, a_5$ | longitudinal trajectory polynomial coefficients | — |
| $b_0, b_1, b_2, b_3, b_4, b_5$ | lateral trajectory polynomial coefficients | — |
| $x_{FR}^{(j)}$ | arc of the free space corridor segment j | m |
| $y_{FR,L}^{(j)}$ | boundary of left lateral position at segment j | m |
| $y_{FR,R}^{(j)}$ | boundary of right lateral position at segment j | m |
| j | number of free space corridor segment | — |
| M | total numbers of segments | — |
| $\underline{X_{FR}}$ | vector of whole set of arc length | — |
| $\underline{Y_{FR}}$ | vector of whole set of boundary of left and right lateral position | — |
| α | vector of longitudinal trajectory polynomial coefficients | — |
| β | vector of lateral trajectory polynomial coefficients | — |
| Δk | sampling time | s |
| Φ | state transition matrix | — |
| PX | vector of longitudinal trajectory | — |
| PX | vector of lateral trajectory | — |
| $\tilde{px}$ | estimated longitudinal position | m |
| $\tilde{py}$ | estimated lateral position | m |
| $\tilde{\dot{px}}$ | estimated longitudinal velocity | m/s |
| $\tilde{\dot{py}}$ | estimated lateral velocity | m/s |
| $\tilde{\ddot{px}}$ | estimated longitudinal acceleration | m/s² |
| $\tilde{\ddot{py}}$ | estimated lateral acceleration | m/s² |
| $\tilde{\dddot{px}}$ | estimated longitudinal jerk | m/s³ |
| $\tilde{\dddot{py}}$ | estimated lateral jerk | m/s³ |
| $e_x$ | longitudinal distance deviation | m |
| $e_y$ | lateral distance deviation | m |
| $e_\psi$ | yaw angle deviation | rad |
| e | deviation vector | — |
| $px_g$ | longitudinal goal position | m |
| $py_g$ | lateral goal position | m |
| $\Delta t_r$ | remain steering intervention time | s |
| Δpx | remain longitudinal distance to goal | m |
| Δpy | remain lateral distance to goal | m |
| $\dot{e}_y$ | lateral velocity deviation | m/s |
| $\ddot{e}_y$ | lateral acceleration deviation | m/s² |
| $\dot{e}_\psi$ | yaw rate deviation | rad/s |
| $\ddot{e}_\psi$ | yaw acceleration deviation | rad/s² |
| $c_f$ | front tire cornering stiffness coefficient | N/rad |
| $c_r$ | rear tire cornering stiffness coefficient | N/rad |
| $l_f$ | distance between the center of gravity to the front axle | m. |
| $l_r$ | distance between the center of gravity to the rear axle | m. |
| $\dot{\psi}^*$ | desired yaw rate | rad/s |
| δ | steering angle | rad |
| g | constant of gravitational acceleration | m/s² |
| m | vehicle mass | kg |
| φ | road angle | rad |
| $I_z$ | mass moment of inertia of the vehicle around the vertical axis | kg/m² |
| $v_x$ | Feedback longitudinal velocity | m/s |
| A | single track model state transition matrix | — |
| B | state input matrix for the steering angle input | — |
| $B_\psi$ | state input matrix for the yaw rate input | — |
| $B_\phi$ | state input matrix for the road bank angle input | — |
| χ | deviation state vector | — |
| ξ | The prediction of Model Predictive Control for the deviation state vector | — |
| M | convolution matrix | — |
| Θ | prediction of a controllability matrix | — |
| N | prediction horizon | — |
| k | discretized time step | — |
| $u_k$ | steering angle at time step k | — |
| $q_{e_y}$ | weight for the lateral distance deviation | — |
| $q_{\dot{e}_y}$ | weight for the lateral velocity deviation | — |
| $q_{e_\psi}$ | weight for the yaw angle deviation | — |
| $q_{\dot{e}_\psi}$ | weight for the yaw rate deviation | — |
| q | weight matrix for the deviation state | — |
| Q | quadratizing weight matrix | — |
| $\hat{Q}$ | concatenated weight matrix of the deviation states for entire prediction horizon | — |
| $r_u$ | weight for the input steering angle | — |
| R | weight matrix for input steering angle | — |
| $\hat{R}$ | Concatenated weight matrix of input steering angle for entire prediction horizon | — |
| H | Hessian matrix of the quadratic cost function | — |
| F | Coefficient vector of linear part of the quadratic cost function | — |
| J | quadratic cost function | — |
| u* | optimal steering angle | rad |
| $A_c$ | Concatenation of equality and inequality constraint matrix | — |
| $b_c$ | state constraint matrix | — |
| $\chi_{ub}$ | upper boundary of the error state vector | — |
| $\chi_{lb}$ | lower boundary of the error state vector | — |
| $B_c$ | concatenation of the state transition matrix | — |
| n | associated predictive horizon | — |
| $a_y^*$ | desired lateral acceleration | m/s² |
| $\delta_{FF}$ | feed forward steering angle | rad |
| RoC | radius of curvature | m |
| κ* | compensated curvature | — |

We claim:

1. A system comprising:
a plurality of sensors having a maximum range of perception capability, the sensors providing information regarding an environment in a vicinity of a vehicle; and
at least one processor and memory configured to:
determine an actual trajectory of the vehicle;
use the information provided by the sensors to determine environmental constraints on movement of the vehicle;
determine a first potential trajectory for the vehicle using a first goal location that is based on the maximum range of perception capability of the plurality of sensors;
determine whether the first potential trajectory satisfies dynamic constraints on the vehicle and the environmental constraints;
use the first potential trajectory as a planned trajectory of the vehicle in response to determining that the first potential trajectory satisfies the dynamic constraints on the vehicle and the environmental constraints;
in response to determining that the first potential trajectory does not satisfy the dynamic constraints on the vehicle and the environmental constraints, determine a second potential trajectory for the vehicle based on a reduced range that is smaller than the maximum range of perception capability, and use the second potential trajectory as the planned trajectory of the vehicle; and
generate control parameters for controlling movement of the vehicle that correspond to minimizing a deviation between the actual trajectory and the planned trajectory.

2. The system of claim 1, wherein the dynamic constraints include at least one of: a minimum limit of velocity; a maximum limit of velocity; a minimum limit of acceleration in a longitudinal direction; a maximum limit of acceleration in a longitudinal direction; a minimum limit of acceleration in a lateral direction; and a maximum limit of acceleration in a lateral direction.

3. The system of claim 1, wherein the environmental constraints define a free space corridor within which the vehicle can travel without collision.

4. The system of claim 1, wherein the at least one processor and memory are further configured to:
determine if the deviation between the actual trajectory and the planned trajectory is greater than a predetermined threshold;
determine a remaining steering intervention time; and
estimate an updated reference trajectory based on the remaining steering intervention time in response to the deviation being greater than the predetermined threshold.

5. The system of claim 1, wherein the at least one processor and memory are further configured to minimize the deviation between the actual trajectory and the planned trajectory of the vehicle by minimizing a cost function based on a single track model of the vehicle.

6. The system of claim 1, wherein the at least one processor and memory are further configured to estimate a compensating curvature which is applied to the actual trajectory in order to redirect the vehicle to the planned trajectory in response to the deviation between the actual trajectory and the planned trajectory of the vehicle increasing.

7. The system of claim 1, wherein the plurality of sensors include at least one of an optical camera, a Radar system, and a Lidar System.

8. A method comprising:
generating, with a plurality of sensors having a maximum range of perception capability, information regarding an environment in a vicinity of a vehicle;
determining, with at least one processor, an actual trajectory of the vehicle;
using, with the at least one processor, the information generated by the sensors to determine environmental constraints on movement of the vehicle;
determining, with the at least one processor, a first potential trajectory for the vehicle using a first goal location that is based on the maximum range of perception capability of the plurality of sensors;
determining, with the at least one processor, whether the first potential trajectory satisfies dynamic constraints on the vehicle and the environmental constraints;
using, with the at least one processor, the first potential trajectory as a planned trajectory of the vehicle in response to determining that the first potential trajectory satisfies the dynamic constraints on the vehicle and the environmental constraints;
in response to determining that the first potential trajectory does not satisfy the dynamic constraints on the vehicle and the environmental constraints, determining, with the at least one processor, a second potential trajectory for the vehicle based on a reduced range that is smaller than the maximum range of perception capability, and use the second potential trajectory as the planned trajectory; and
generating, with the at least one processor, control parameters for controlling movement of the vehicle that correspond to minimizing a deviation between the actual trajectory and the planned trajectory.

9. The method of claim 8, wherein the dynamic constraints include at least one of: a minimum limit of velocity; a maximum limit of velocity; a minimum limit of acceleration in a longitudinal direction; a maximum limit of acceleration in a longitudinal direction; a minimum limit of acceleration in a lateral direction; and a maximum limit of acceleration in a lateral direction.

10. The method of claim 8, wherein the environmental constraints define a free space corridor within which the vehicle can travel without collision.

11. The method of claim 8, further comprising:
determining, with the at least one processor, if the deviation between the actual trajectory and the planned trajectory is greater than a predetermined threshold;
determining, with the at least one processor, a remaining steering intervention time; and
estimating, with the at least one processor, an updated reference trajectory based on the remaining steering intervention time in response to the deviation being greater than the predetermined threshold.

12. The method of claim 8, further comprising minimizing, with the at least one processor, the deviation between the actual trajectory and the planned trajectory of the vehicle by minimizing a cost function based on a single track model of the vehicle.

13. The method of claim 8, further comprising estimating, with the at least one processor, a compensating curvature which is applied to the actual trajectory in order to redirect the vehicle to the planned trajectory in response to the deviation between the actual trajectory and the planned trajectory of the vehicle increasing.

14. The method of claim 8, wherein the plurality of sensors include at least one of an optical camera, a Radar system, and a Lidar System.

15. A non-transitory computer readable medium comprising instructions for carrying out the method of claim 8.

* * * * *